United States Patent [19]

Yurchenco et al.

[11] Patent Number: 4,944,481
[45] Date of Patent: Jul. 31, 1990

[54] BALANCED MONITOR STAND

[75] Inventors: James R. Yurchenco, Palo Alto; Eugene F. Duval, Menlo Park, both of Calif.

[73] Assignee: NeXT, Inc., Redwood City, Calif.

[21] Appl. No.: 213,356

[22] Filed: Jun. 30, 1988

[51] Int. Cl.⁵ .............................................. A47G 1/24
[52] U.S. Cl. .............................. 248/372.1; 248/292.1; 248/608; 248/923
[58] Field of Search ....................... 248/372.1, 1 I, 371, 248/608, 292.1, 123.1, 923, 922, 920, 921; 16/308

[56] References Cited

U.S. PATENT DOCUMENTS

| D. 277,673 | 2/1985 | Dresselhaus et al. | D14/106 |
| D. 285,687 | 9/1986 | Manock et al. | D14/106 |
| D. 285,688 | 9/1986 | Manock et al. | D14/106 |
| D. 290,706 | 7/1987 | Peart et al. | D14/114 |
| 1,102,556 | 7/1914 | Swartz | 16/308 |
| 2,965,155 | 12/1960 | Henrickson et al. | 248/608 X |
| 3,031,164 | 4/1962 | Schopp | 248/608 X |
| 3,209,391 | 10/1965 | Mangini | 16/308 X |
| 4,624,434 | 11/1986 | Lake, Jr. et al. | 248/372.1 X |
| 4,683,465 | 7/1987 | Lake, Jr. et al. | 340/700 |

FOREIGN PATENT DOCUMENTS 899853 11/1953 Fed. Rep. of Germany ...... 248/608

OTHER PUBLICATIONS

R. Lilliston, "Sizing Torsional Leaf Springs", *Machine Design*, vol. 54, no. 15, Jun. 24, 1982, pp. 67-71.

*Primary Examiner*—Alvin C. Chin-Shue
*Attorney, Agent, or Firm*—Laurence S. Rogers; Jeffrey H. Ingerman

[57] ABSTRACT

An adjustable monitor stand for pivoting a monitor about a horizontal axis which is relatively simple to operate and which does not require great effort to adjust is provided. The stand includes a base, a platform for holding the monitor, and a hinge interconnecting the base and the platform. The hinge includes a torsion spring selected with regard to the mass of the monitor and the distance of its center of gravity from the axis so that the gravitational torque produced as the monitor is pivoted with the platform about the horizontal axis is always substantially balanced by the restoring torque generated by the spring. The stand therefore requires very little effort to adjust.

24 Claims, 4 Drawing Sheets

BALANCED MONITOR STAND

BACKGROUND OF THE INVENTION

This invention relates to a stand for pivotally supporting an object. More particularly, this invention relates to a stand for a computer monitor, which allows the monitor to be rotated about a horizontal axis.

Cathode-ray tube (CRT) monitors for computers generally are designed to sit in a fixed position on a table or other support surface. For example, personal computer monitors are usually separate from the system unit containing the computer's processor and disk drives, and the monitor is intended to sit on top of the system unit. However, in order to accommodate differences in operator height and in lighting conditions, it is desirable to be able to adjust the position of the monitor.

It is known to provide mounts or stands for computer monitors which allow the monitor position to be adjusted. However, known stands frequently have multiple arms, sometimes biased with heavy springs, requiring relatively large effort to adjust the monitor position, and they also frequently have locking devices to hold them in place which must be deactivated and then reactivated after each adjustment.

It would be desirable to be able to provide an adjustable monitor stand which is relatively simple to operate and which does not require great effort to adjust.

SUMMARY OF THE INVENTION

It is an object of this invention to provide an adjustable monitor stand which is relatively simple to operate and which does not require great effort to adjust.

In accordance with this invention, there is provided a stand for supporting an object above a surface, the object having a mass and a center of gravity. The object can be rotated about a horizontal axis between two extreme angular positions. The stand includes a base for resting on the surface, a platform for holding the object, and a hinge linking the base and the platform. The hinge includes a spring capable of torsional deflection, one end of the spring being rotationally fixed relative to the base and another end of the spring being rotationally fixed relative to the platform, relative rotational movement of the base and the platform creating a restoring torque in the spring. The spring has a torque constant selected with regard for the mass of the object and the distance from the center of gravity of the object to the axis so that the restoring torque substantially balances any gravitational torque acting on the center of gravity of the object when the platform holding the object is rotated to any angular position between the extreme positions.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
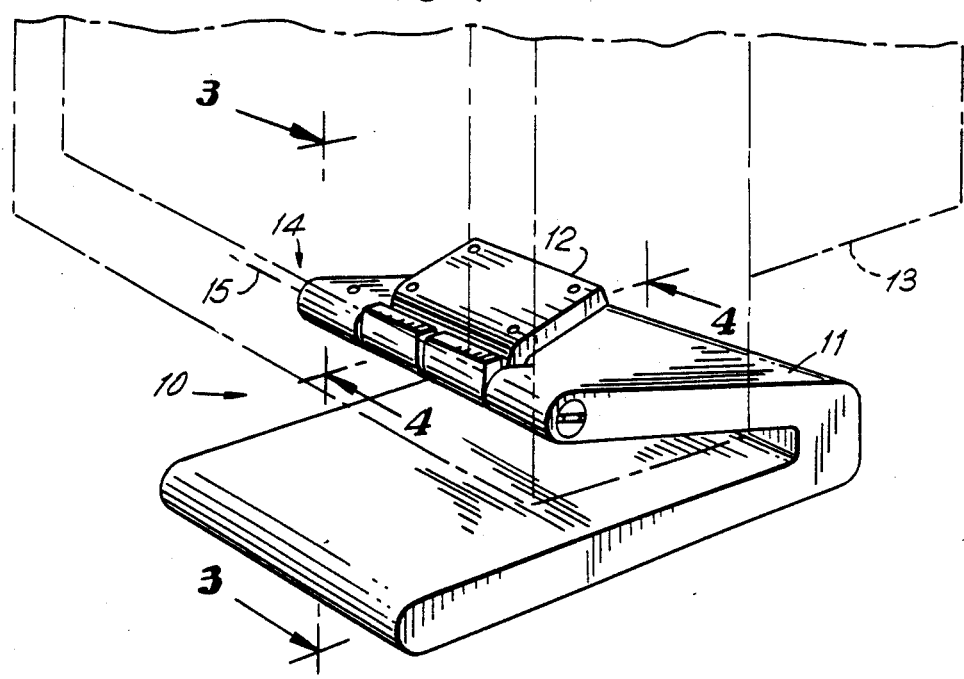
FIG. 1 is a perspective view of a preferred embodiment of a stand according to the invention, with a monitor shown in phantom.
Figure 3:
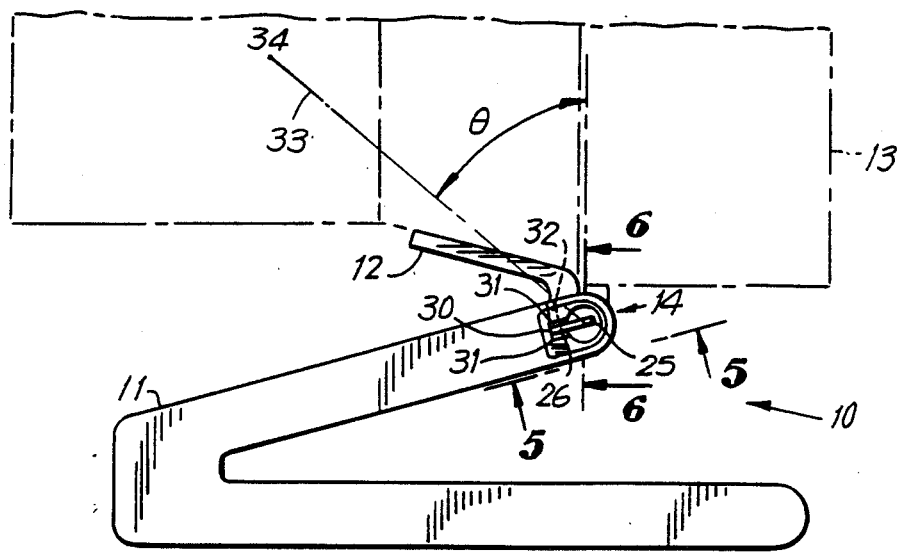
FIG. 3 is a side elevational view of the stand of FIGS. 1 and 2, taken from line 3—3 of FIG. 1.

A preferred embodiment of a monitor stand 10 according to the invention is illustrated in FIGS. 1-10. Stand 10 has a base 11, and a platform 12 on which rests monitor 13 (shown schematically in phantom). Base 11 and platform 12 are interconnected by hinge 14. As described in more detail below, hinge 14 can rotate about horizontal axis 15 between predetermined angular extremes and is spring-loaded so that when platform 12 and monitor 13 are rotated about axis 15 within those extremes, a spring-generated restoring torque substantially counterbalances any gravitational torque on platform 12 and monitor 13. Therefore, platform 12 and monitor 13 will remain in any angular position into which they are rotated. Because the spring and gravitational torques are always substantially balanced, very little effort is required to reposition the monitor when desired.

Hinge 14 includes an axle 60 which is received in axle-receiving collars 22, 23 on base 11, and which is engaged by clamp 24 of platform 12. Axle 60 is made up of two hollow tubular axle sections 61, 62. Each axle section 61, 62 has an extension 63, 64 which extends linearly from the adjacent end of each respective axle section 61, 62 toward the other section 62, 61. The angular extent of each extension 63, 64 is less than 180 degrees about the circumference of the respective axle section 61, 62. Extension 63 extends angularly 180 degrees less angle $\alpha$, while extension 64 extends 180 degrees less angle $\beta$. Extensions 63, 64 thus provide stops limiting the relative rotation of sections 61, 62 to an angle $\alpha+\beta$. Although in the preferred embodiment depicted in FIGS. 1-10 sections 61, 62 are identical, so that $\beta=\alpha$ and the total angular freedom of rotation is twice $\alpha$, sections 61, 62, and therefore angles $\alpha$, $\beta$, may differ. In fact, it is possible to provide axle sections that abut without extensions, and to provide another form of stop. However, using extensions 63, 64 allows one to provide stops without taking up additional space within hinge 14.

Within axle 60 is a flat torsion spring 25 of suitable metallic or other spring material. In the preferred embodiment, the spring is made of heat-treated cold rolled steel and the desired spring characteristics are actually obtained by using as spring 25 a two-leaf torsional leaf spring having two identical springs placed side-by-side, although a single spring or a leaf spring with more than two leaves could be used as necessary to obtain the desired spring characteristics of high torque in a small volume. Each axle section 61, 62 has a keyway 65, 66 at the end thereof remote from the other section 62, 61 in which a respective end of spring 25 is received. The keyway 65, 66 is formed by filling in the hollow cylindrical interior 70., 80 of section 61, 62, leaving a slot into which the respective end of spring 25 is inserted. For reasons to be discussed below, each keyway 65, 66 is cut through the exterior of respective axle section 61, 62. With the ends of spring 25 trapped in keyways 65, 66, if sections 61, 62 are rotated relative to one another (within the limits imposed by extensions 63, 64), spring 25 generates a restoring torque to bring sections 61, 62 back to their original relative positions. The spring torque which provides the restoring torque is given by:

$$\tau = K\theta,$$

where $\theta$ is the relative angle through which sections 61, 62 are rotated, and k is the torsional spring constant of spring 25.

By rotationally fixing base 11 relative to one axle section 61 and platform 12 to other axle section 62, and properly choosing the spring constant k relative to the mass of monitor 13 or whatever other object is being supported and the distance 33 from center of gravity 34 of objeCt 13 to axis 15, one can assure that the restoring torque substantially balances any gravitational torque on the object. The gravitational torque is given by:

$$\tau = mgr\sin\theta$$

where $\theta$ is defined as above, m is the mass of monitor 13, g is the acceleration of gravity, and r is the length of distance 33. For small enough $\theta$, such as that within the limits provided by extensions 63, 64, this can be approximated as:

$$\tau = mgr\theta.$$

Thus the gravitational torque varies directly with the angular displacement, as does the restoring torque, as set out above.

In accordance with the preferred embodiment, platform 12 is rigidly fixed to axle section 62 by providing screws 50, 51 which tighten clamp 24 rigidly around axle section 62. Base 11 is rigidly fixed to axle section 61 by providing at the end of spring 25 received in keyway 64 a tab 26, and by providing in collar 22 a base keyway 30. Tab 26 extends out of axle keyway 65 into base keyway 30, preventing relative rotation of base 11 and axle section 61. It is to allow the projection of tab 26 that keyways 65, 66 are cut through the exterior of axle sections 61, 62. Base keyway 30 may be provided with a chamfered lead-in 31 so that tab 26 can more easily be inserted into base keyway 30 as axle 60 is inserted through collars 22, 23 on assembly of stand 10. A set screw 32 in base 11 traps tab 26 in base keyway 30, taking up any any clearance that may be provided in base keyway 30 for ease of assembly, as well as retaining axle 60 against accidental or unintentional horizontal withdrawal from collars 22, 23. A bushing 20 is provided between axle section 61 and clamp 24, which rotate relative to one another, and a second bushing 21 is provided between axle section 62 and collar 23, which also move relative to one another.

Figure 2:
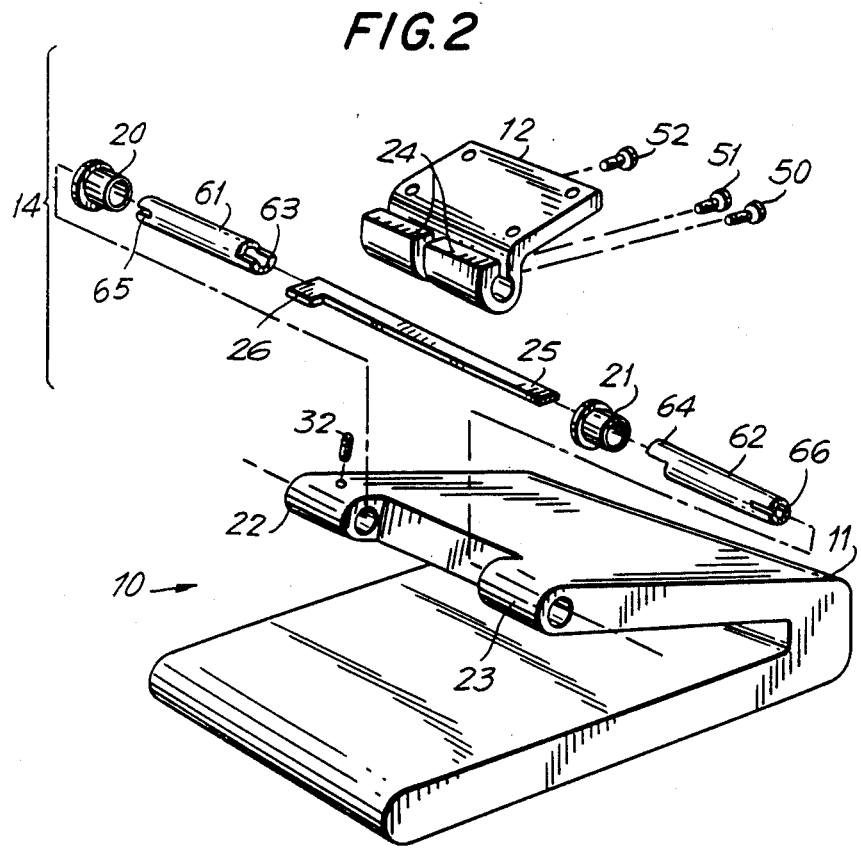
FIG. 2 is an exploded perspective view of the stand of FIG. 1.
Figure 7:
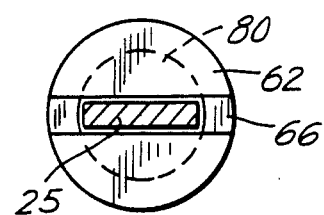
FIG. 7 is an elevational view of one end of an axle according to the invention, taken from line 7—7 of FIG. 6.
Figure 4:
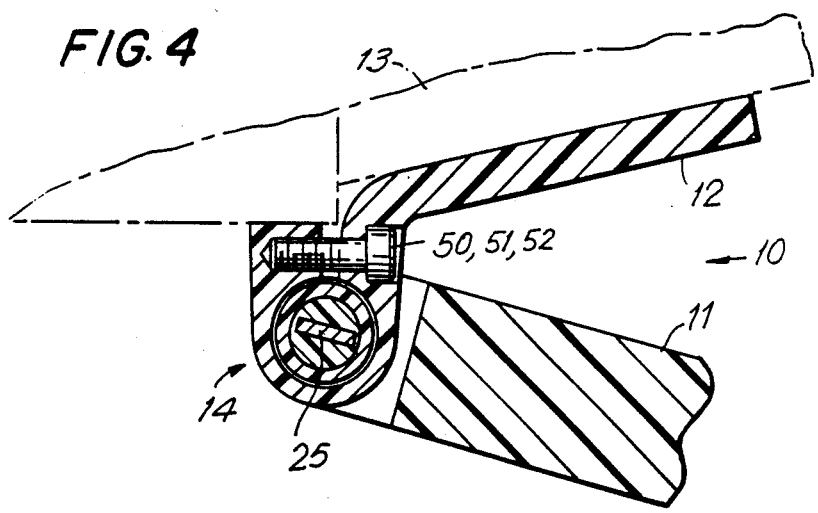
FIG. 4 is a vertical cross-sectional view of the stand of FIGS. 1-3, taken from line 4—4 of FIG. 1.
Figure 5:
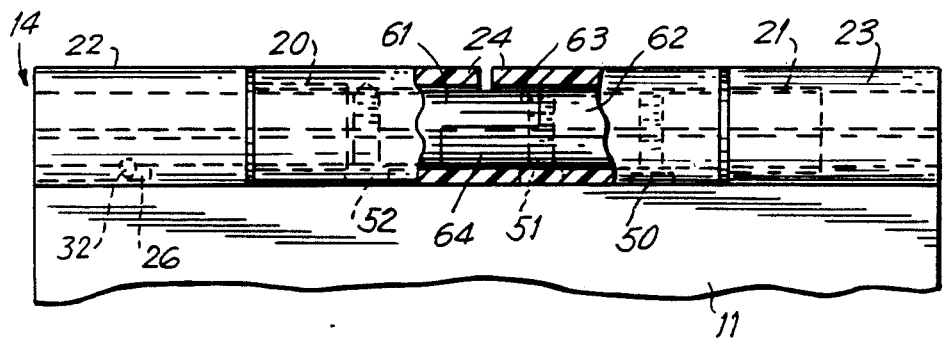
FIG. 5 is a fragmentary view of a hinge according to the invention, taken from line 5—5 of FIG. 3.
Figure 6:
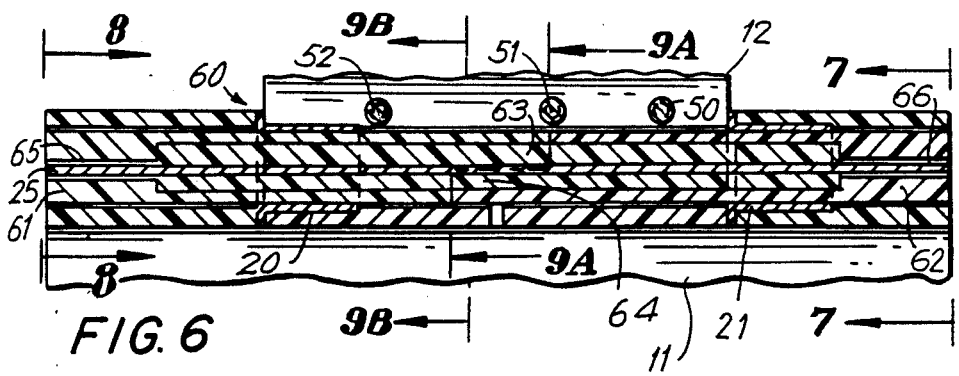
FIG. 6 is a cross-sectional view of an axle according to the invention, taken from line 6—6 of FIG. 3.
Figure 8:
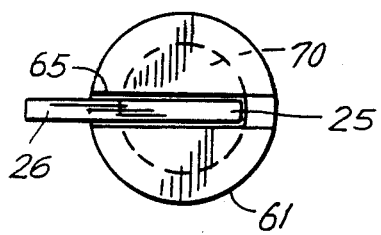
FIG. 8 is an end elevational view of the other end of an axle according to the invention, taken from line 8—8 of FIG. 6.
Figure 9A:
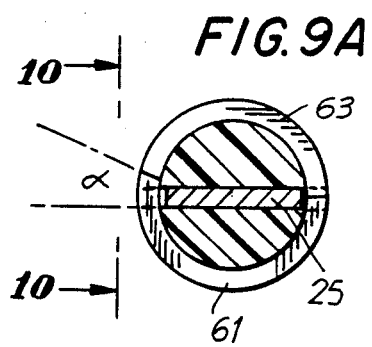
FIG. 9A a cross-sectional view of an axle according to the invention, taken from line 9A—9A of FIG. 6.
Figure 9B:
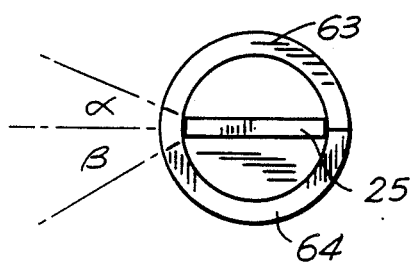
FIG. 9B is a vertical cross-sectional view of an axle according to the invention, taken from line 9B—9B of FIG. 6.
Figure 10:
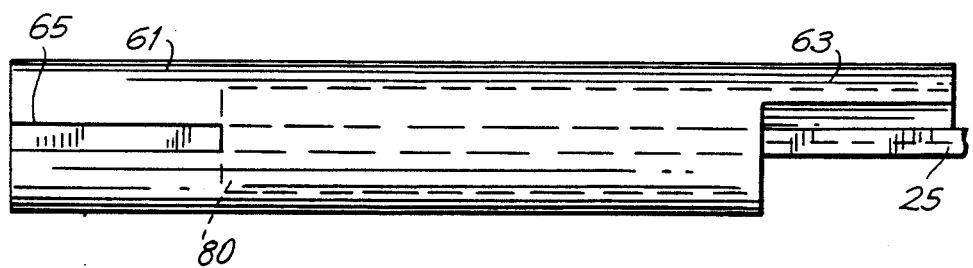
FIG. 10 is an elevational view of an axle according to the invention, taken from line 10—10 of FIG. 9A.

It should be noted that the functional relationship of the components of hinge 14 is as shown in FIG. 2. However, because of tab 26, for assembly purposes spring 25 must be inserted through slot 65 after the other components of hinge 14 are assembled.

The center of gravity of monitor 13 must be over axis 15 when spring 25 is in its neutral position. Platform 12 in the preferred embodiment has a non-horizontal neutral position. When monitor 13 is horizontal, its center of gravity is behind axis 15, and spring 25 is providing a restoring torque tending to lift the back of monitor 13, balancing the gravitational torque tending to drop the back of monitor 13.

Theoretically, the arrangement as described should be sufficient to provide a restoring torque that balances the gravitational torque on monitor 13. However, in practice, tolerances in spring 25, and particularly in its spring constant, as well as offsets resulting from assembly of stand 10 or other offsets or tolerances, may result in a slight imbalance between the gravitational torque and the restoring torque. In order to compensate for this imbalance, and to prevent the system from "coasting" past the desired position whether or not there is imbalance between the gravitational and restoring torques, screw 52 is provided which tightens clamp 24 around axle section 61 to a degree sufficient to provide frictional braking and compensation without making adjustment of the stand difficult. The amount of frictional torque that must be provided varies depending on the particular offsets and tolerances causing the imbalance. However, if the gravitational and restoring torques were not substantially balanced as provided by the invention, the amount of frictional torque that would have to be provided, as in known stands relying solely on friction, would be greater, resulting in a stand that is difficult to adjust.

Thus it is seen that an adjustable monitor stand which is relatively simple to operate and which does not require great effort to adjust is provided. One skilled in the art will appreciate that the present invention can be practiced by other than the described embodiments, which are presented for purposes of illustration and not of limitation, and the present invention is limited only by the claims which follow.

What is claimed is:

1. A stand for supporting an object above a surface, said object having a mass and a center of gravity, such that said can be rotated about a horizontal axis between two extreme angular positions, said center of gravity being at a distance from said axis, said stand comprising:

base means for resting on said surface;

platform means for holding said object; and hinge means linking said base means and said platform means, said hinge means comprising:

a hollow axle aligned with said axis and having first and seconds ends, said axle having first and second tube sections, each of said sections having an end remote from its respective axle end and an extension at said remote end extending less than 180 degrees about said axis, said first and second axle sections abutting with said extensions in overlapping relationship, said extensions forming stop means defining said extreme positions, first and second means on said base for receiving said first and second ends, respectively, of said axle, means on said platform for rigidly engaging one of said first and second tube sections, and spring means capable of torsional deflection disposed within said axle, one end of said spring means being rotationally fixed relative to another of said first and second tube sections and another end of said spring means being rotationally fixed relative to said one of said first and second tube sections, such that relative rotational movement of said base means and said platform means creates a restoring a torque in said spring means, said spring means having a torque constant selected with regard for said mass and said distance so that said restoring torque substantially balances gravitational torque acting on said center of gravity when said platform means holding said object is rotated to different angular positions between said extreme positions.

2. The stand of claim 1 further comprising friction means for compensating for imbalance between said gravitational torque and said restoring torque.

3. The stand of claim 1 further comprising stop means for preventing rotation beyond said extreme angular positions.

4. The stand of claim 1 wherein said engaging means frictionally engages said other of said first and second sections sufficiently compensate for imbalance between said gravitational torque and said restoring torque.

5. The stand of claim 4 wherein:
said spring means is a substantially rectangular flat spring having a long dimension extending along said axis and a short dimension perpendicular to said long dimension;
said first tube section has a first axle keyway therein for rotationally fixing said spring relative to said first tube section; and
said second tube section has a second axle keyway therein for rotationally fixing said spring relative to said second tube section.

6. The stand of claim 6 wherein:
said spring comprises a tab extending from said one end thereof in the direction of said short dimension; and
said first axle-receiving means has a base keyway therein for receiving said tab, thereby rotationally fixing said first axle section and said one end of said spring means relative to said base.

7. A stand for supporting an object above a surface, said object having a mass and a center of gravity, such that said obJect can be rotated about a horizontal axis between two extreme angular positions, said center of gravity being at a distance from said axis, said stand comprising:
base means for resting on said surface;
platform means for holding said object; and
hinge means linking said base means and said platform means, said hinge means comprising:
a hollow axle aligned with said axis and having first and second ends, said axle comprising first and second hollow tube sections adjacent respective ends of said axle, said first and second tube sections having respective first and second axle keyways therein and said base having a first base keyway therein, each of said axle sections having an end remote from its respective axle end and an extension at said remote end extending less than 180 degrees about said axis, said first and second axle sections abutting with said extensions in overlapping relationship, said extensions forming stop means defining said extreme positions,
first and second axle-receiving means on said base for receiving said first and second ends, respectively, of said axle,
clamp means on said platform for engaging around said axle, said clamp means being rigidly clamped about said second tube section, and being clamped about said first tube section in frictional engagement sufficient to compensate for imbalance between said gravitational torque and said restoring torque, and
spring means disposed within said axle, said spring means being a substantially rectangular flat spring capable of torsional deflection and having a long dimension extending along said axis and a short dimension perpendicular to said long dimension, one end of said spring means being received in said first axle keyway for rotationally fixing said one end relative to said first axle section and another end of said spring means being received in said second axle keyway for rotationally fixing said another end relative to said second axle section, said spring further having a tab extending from said one end thereof in the direction of said short dimension, said tab being received in said base keyway thereby rotationally fixing said first axle section and said one end of said spring means relative to said base, relative rotational movement of said base means and said platform means creating a restoring torque in said spring means; wherein:
said spring means has a torque constant selected with regard for said mass and said distance so that said restoring torque substantially balances any gravitational torque acting on said center of gravity when said platform means holding said object is rotated to any angular position between said extreme positions; and
said clamping means is clamped about said first tube section in frictional engagement sufficient to compensate for imbalance between said gravitational torque and said restoring torque.

8. An adjustable stand for supporting an object, comprising:
a base;
a pivotable platform for said object; and
means for rotationally coupling said pivotable support to said base, said coupling means including:
at least one axle-receiving tube connected to said base,
an axle having two hollow parts, each part of said axle having remote from its respective axle end an extension at said remote end extending less than 180 degrees about said axis, said two axle parts abutting with said extensions in overlapping relationship, said extensions forming stop means defining extreme rotational positions,
spring means disposed within said axle, and
clamp means on said platform for engaging around said axle.

9. The stand of claim 8 wherein said clamp means engages around one part of said axle, said stand further comprising friction means for engaging the other part of said axle.

10. The stand of claim 8 comprising two axle-receiving tubes connected to said base respectively receiving first and second ends of said axle.

11. The stand of claim 8 wherein one end of said spring means is rotationally fixed relative to one part of said two-part axle and the other end of said spring means is rotationally fixed relative to the other part of said two-part axle.

12. The stand of claim 11 wherein:
said one axle part has a first axle keyway for rotationally fixing said spring relative thereto; and
said other axle part has a second axle keyway for rotationally fixing said spring relative thereto.

13. The stand of claim 8 wherein:
said spring comprises a table extending from an end thereof adjacent one of said axle parts; and
said axle-receiving tube has a base keyway therein for receiving said tab, thereby rotationally fixing said one of said axle parts and said end of said spring means relative to said base.

14. The stand of claim 8 wherein said spring means is a torsion spring.

15. The stand of claim 14 wherein said torsion spring is a torsion bar.

16. An adjustable stand for supporting an object, said object having a mass and a center of gravity, said stand comprising:
a base;
a pivotable platform for said object; and
means for rotationally coupling said pivotable support to said base, said coupling means including at least one axle-receiving tube connected to said base, an axle having two hollow parts, each part of said axle having an end of said part remote from its respective axle end and an extension at said remote end extending less than 180 degrees about said axis, said two axle parts abutting with said extensions in overlapping relationship, said extensions forming stop means defining extreme rotational positions, spring means disposed within said axle, and clamp means on said platform for engaging around said axle, said center of gravity being at a distance from said axle, said spring means having a torque constant selected with regard to said mass and said distance so that said spring means substantially balances gravitational torque on said center of gravity when said platform is pivoted to different angular positions.

17. The stand of claim 16 wherein said clamp means engages around one part of said axle, said stand further comprising friction means for engaging the other part of said axle.

18. The stand of claim 16 further comprising stop means for preventing rotation of said coupling means beyond extreme angular positions.

19. The stand of claim 16 comprising two axle-receiving tubes connected to said base for respectively receiving first and second ends of said axle.

20. The stand of claim 16 wherein one end of said spring means is rotationally fixed relative to one part of said two-part axle and the other end of said spring means is rotationally fixed relative to the other part of said two-part axle.

21. The stand of claim 20 wherein:
said one axle part has a first axle keyway for rotationally fixing said spring relative thereto; and
said other axle part has a second axle keyway for rotationally fixing said spring relative thereto.

22. The stand of claim 16 wherein:
said spring comprises a tab extending from an end thereof adjacent one of said axle parts; and
said axle-receiving tube has a base keyway therein for receiving said tab, thereby rotationally fixing said one of said axle parts and said end of said spring means relative to said base.

23. The stand of claim 16 wherein said spring means is a torsion spring.

24. The stand of claim 23 wherein said torsion spring is a torsion bar.

* * * * *